May 7, 1968 R. A. WITTREN ET AL 3,381,712
HYDRAULIC CONTROL VALVE
Filed March 21, 1966 2 Sheets-Sheet 1

INVENTORS
R. A. WITTREN &
D. R. KING

May 7, 1968

R. A. WITTREN ET AL 3,381,712

HYDRAULIC CONTROL VALVE

Filed March 21, 1966

*INVENTORS*
R. A. WITTREN &
D. R. KING

United States Patent Office 3,381,712
Patented May 7, 1968

3,381,712
HYDRAULIC CONTROL VALVE
Richard Arthur Wittren and Donald Ray King, Cedar Falls, Iowa, assignors to Deere & Company, Moline, Ill., a corporation of Delaware
Filed Mar. 21, 1966, Ser. No. 536,108
8 Claims. (Cl. 137—625.2)

This invention relates to an improved control valve for a hydraulic control system such as that used in a vehicle power steering.

A power steering system conventionally includes a two-way hydraulic cylinder and a control valve selectively actuated by the steering wheel shaft and automatically returned to neutral when the steering gear reaches the position corresponding to that of the steering wheel. Many systems are of the open-center type and conventionally use spool valves, which require extremely close fits between the valve spool and valve body to minimize undesirable leakage, necessitating selective fitting of the spool valve and creating other production problems.

The primary object of the present invention is to provide a novel valve which eliminates such manufacturing problems. More specifically, the object of the invention is to provide a poppet type valve which effects a minimum leakage valve shutoff without the need for extremely close fits. Another object is to provide such valve in the form of a simple, deflectable disk. Another feature of the invention is that the valve disk functions as a centering spring and provides a certain amount of feel at the steering wheel. Still another feature of the valve resides in the provision of a built-in hydraulic imbalance which appears when the valve is actuated and reduces the force necessary to operate the valve.

These and other objects will become apparent from the following detailed description and accompanying drawings wherein.

Figure 1:
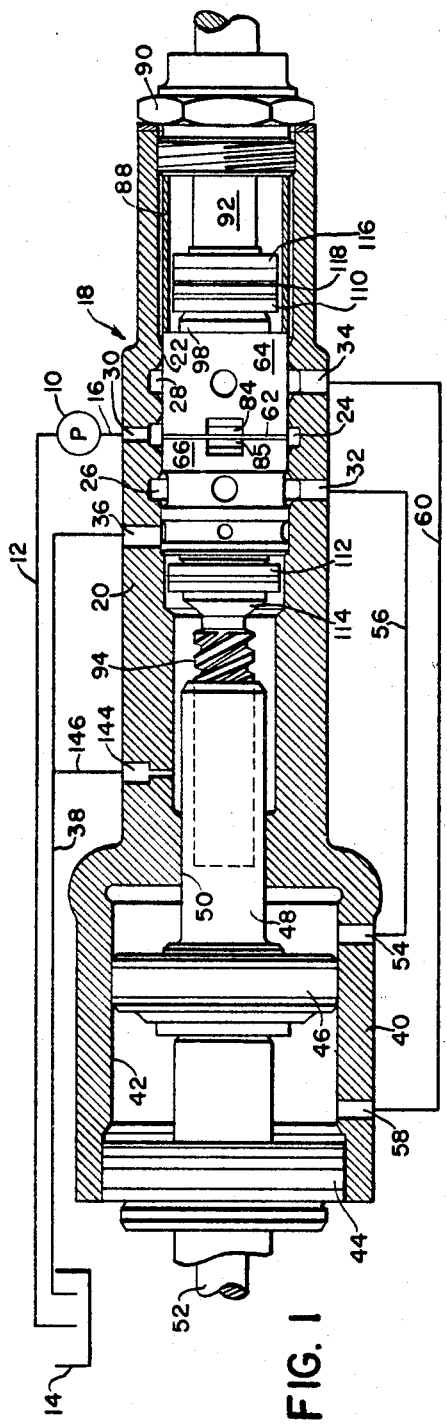
FIG. 1 is a partly sectional and partly schematic view of the novel hydraulic valve as incorporated in a vehicle power steering system by way of example.
Figure 2:
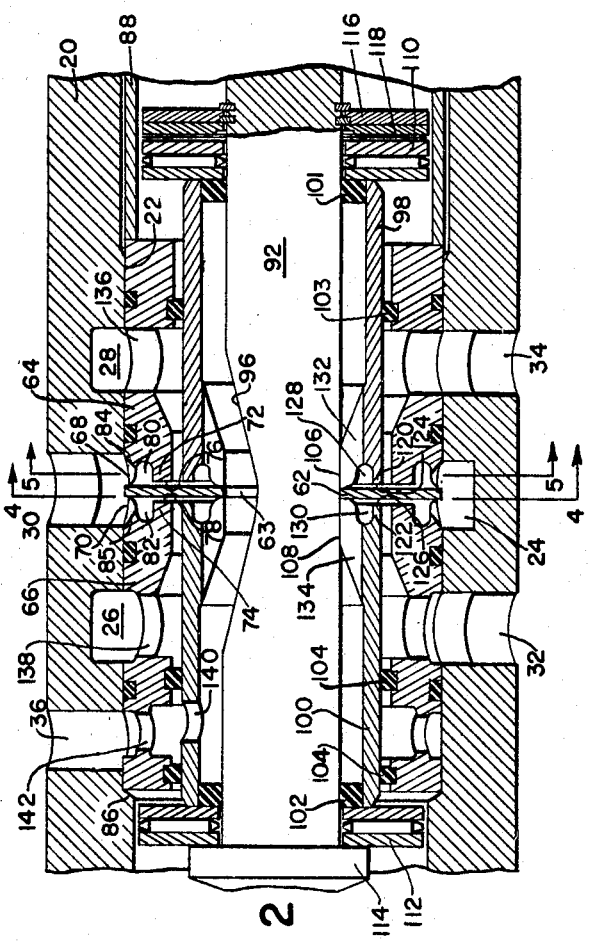
FIG. 2 is an enlarged axial section of the valve portion of the system shown in FIG. 1, showing the valve in a neutral condition.
Figure 4:
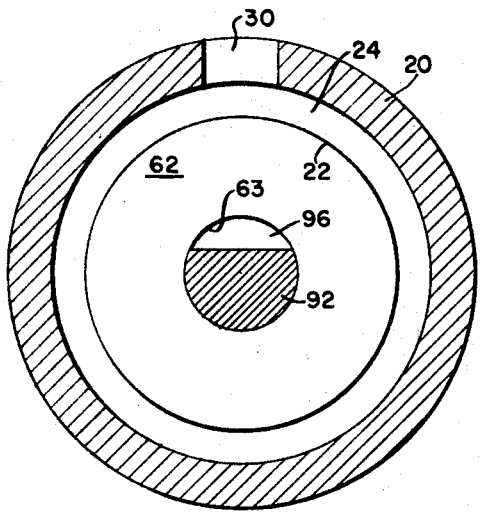
Figure 5:
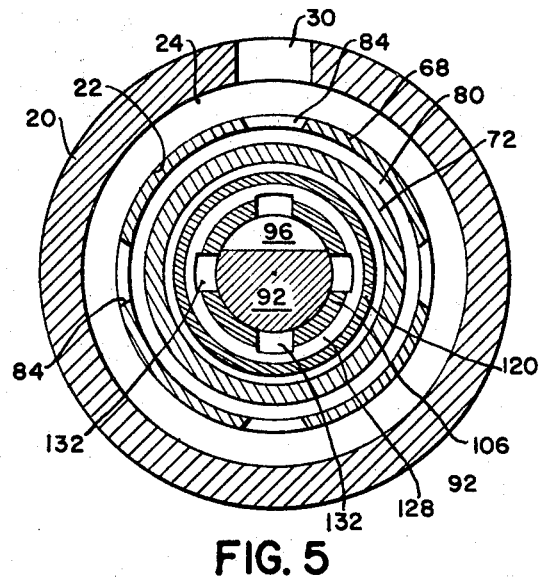

FIGS. 4 and 5 are transverse sections along the lines 4—4 and 5—5 respectively in FIG. 2.

The hydraulic system includes a source of fluid pressure 10 connected by an inlet line 12 to a reservoir 14 and by a discharge line 16 to a hydraulic valve 18. The valve 18 includes a cylindrical valve body 20 having an elongated axial bore 22 formed with an annular inlet recess 24 axially between a pair of annular outlet recesses 26 and 28. The inlet recess 24 is connected to an inlet port 30 in the valve body 20, and the outlet recesses 26 and 28 are respectively connected to left and right turn outlet ports 32 and 34 in the valve body 20. A sump or return port 36 also communicates with the valve bore 22 and is connected to the reservoir 14 via a return line 38.

The valve body 20 has an enlarged portion 40 at one end, which, in a vehicle power steering system, is generally forwardly from and lower than the opposite end. The above orientation, as well as the use of such words as "upper," "lower," "forwardly," "rearwardly" etc. is for the purpose of clarity only, and is not to be construed as limiting the invention.

The enlarged body portion 40 has a cylindrical bore 42 coaxial with the bore 22 and closed by an end member 44. A piston 46 in the bore 42 includes an upper piston shaft 48, extending through a bore 50 coaxial with an interconnecting the bores 42 and 22, and a lower piston shaft 52, extending through the end member 44 and connected at its lower end to conventional vehicle steering gear (not shown). The body portion 40 has a left turn inlet port 54 above the piston 46 and connected to the outlet port 32 by a line 56, and a right turn inlet port 58 below the piston 46 and connected to the outlet port 34 by a line 60.

An annular disk-like valve member 62, having a central circular opening 63, is coaxially mounted in the bore 22 between a pair of outer sleeve members 64 and 66, which are tightly and coaxially mounted in the bore 22 and which respectively include opposite, axially extending lips 68 and 70 at their outer periphery between which the valve member 62 is clamped at its outer periphery. The outer sleeve members 64 and 66 also respectively include opposite, axially extending inner peripheral lips 72 and 74, the radial faces of which are spaced a relatively small distance from the opposite sides of said valve member and form circular valve seats 76 and 78 respectively. The lips 68 and 72 on the member 64 and the lips 70 and 74 on the member 66 respectively define annular recesses 80 and 82 on opposite sides of the valve member 62, and these recesses are respectively connected to the inlet recess 24 by a plurality of radial passages 84 and 85 through the outer lips 68 and 70. The stacked sleeve members 64 and 66 and the valve member 62 are clamped against a shoulder 86 in the bore 22 by an annular spacer 88, coaxially pressed against the upper sleeve member 64 by an end member 90 threaded into the upper end of the bore 22.

A steering shaft 92 extends coaxially through the end member 90 and througgh the valve member opening 63 and is coaxially connected to the piston shaft 48 through a screw thread 94, whereby the steering shaft 92 is axially shiftable relative to the shaft 48 in response to relative rotation of the shafts, which is conventionally accomplished through an operator-actuated steering wheel (not shown). The steering shaft 92 has a flat portion 96 opposite the valve member 62 to permit fluid communication between the opposite sides of the valve member 62 adjacent the steering shaft periphery.

A pair of inner sleeve members 98 and 100 are respectively coaxially mounted between the outer sleeve members 64 and 66 and the shaft 92 on opposite sides of the valve member 62. A pair of seals 101 and 102 are respectively mounted between the opposite ends of the sleeve members 98 and 100 and the shaft 92 and seals 103 and 104 are respectively mounted between the inner sleeve members 98 and 100 and the outer sleeve members 64 and 66. The inner sleeve members 98 and 100 respectively include opposite axially extending lips 106 and 108 at their inner peripheries, respectively engaging and clamping the opposite sides of the valve member 62 at its inner periphery. The inner sleeve members and the valve member 62 are axially clamped to the shaft 92 between upper and lower thrust bearings 110 and 112, the lower thrust bearing 112 seating against a shoulder 114 on the shaft 92 and the upper thrust bearing 110 being clamped against the upper sleeve member 98 by retaining rings 116 mounted on the shaft 92. Shims 118 are provided between the thrust bearing 110 and the retaining rings 116 to take up the manufacturing tolerances, preventing any axial shifting of the inner sleeve members 98 and 100 relative to the shaft 92.

The sleeve members 98 and 100 also respectively include axially extending lips 120 and 122 at their outer peripheries, the radial end faces of which are spaced a relatively short distance from the opposite sides of the valve member 62 and respectively form circular valve seats 124 and 126. A pair of annular recesses 128 and 130 respectively between the lips 106 and 120 and the lips 108 and 122 on opposite sides of the valve member 62 are in fluid communication with the space between the shaft 92 and the sleeve members 98 and 100 via a plurality of radial passages 132 and 134 through the inner lips 106 and 108 respectively. The space between the inner sleeve member 98 and the outer sleeve member 64, between the seal 103 and the valve member 62, is connected to the right turn outlet recess by a plurality of radial passages 136 through the outer sleeve member 64. Similarly, the space between the inner sleeve member 100 and the outer sleeve member 66, between the seal 104 and the valve member 62, is connected to the left turn outlet recess by a plurality of radial passages 138 through the outer sleeve member 66. The space between the shaft 92 and the inner sleeve members 98 and 100 is connected to the sump or return port 36 via a radial opening 140 in the inner sleeve member 100 and a radial opening 142 in the outer sleeve member 66, between the seals 104. The lower end of the bore 22, below the sleeve members, is also connected to the reservoir line 38 via a bleed outlet 144 in the body 20 and a bleed line 146, to prevent a hydraulic lock during the axial shifting of the steering shaft 92 or the piston shaft 48.

In operation, when the position of the steering wheel and consequently the shaft 92 is maintained, the valve member 62 inherently maintains its neutral condition, as shown in FIG. 2, wherein the valve member is spaced from both valve seats 76 and 78 on the outer sleeve members and valve seats 124 and 126 on the inner sleeve members. Pressurized fluid from the inlet recess 24 flows through the passages 84 and 85 on both sides of the valve member 62, flows between the valve member and the valve seats 76 and 78, and continues inwardly through the space between the valve member 62 and the valve seats 124 and 126 and through the passages 132 and 134 to the space between the inner sleeve members 98 and 100 and the shaft 92, whence it returns to the sump or return line 38 through the passages 142, 140, and 36. Both sides of the cylinder 42 are connected to the sump via the left and right turn inlets 54 and 58, the lines 56 and 60, the outlet ports 32 and 34, the annular recesses 26 and 28, the radial openings 138 and 136, the passages between the valve member 62 and the valve seats 126 and 124, and again the passages 132 and 134, the radial openings 142 and 140 and the return port 36.

Figure 3:
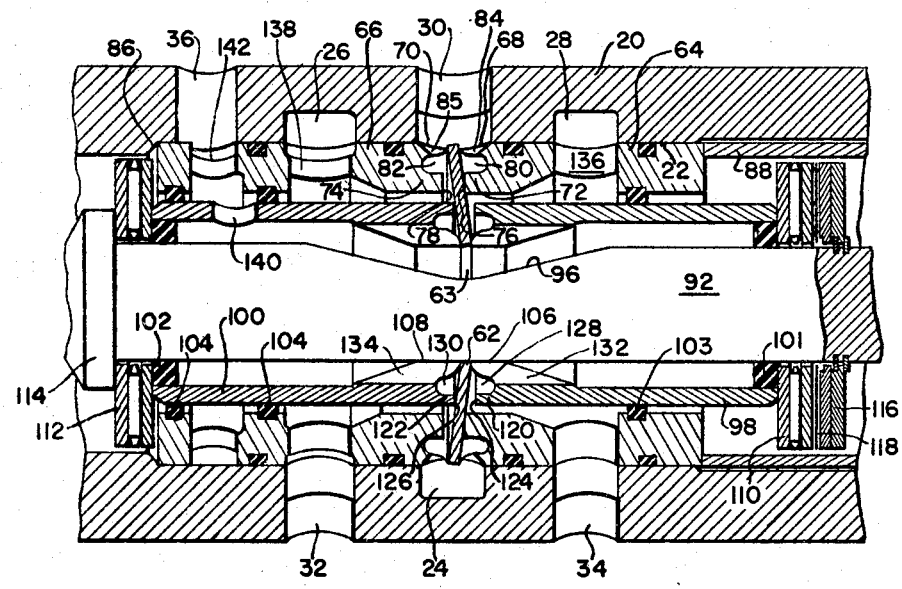
FIG. 3 is a view, similar to FIG. 2, showing the valve actuated for a left-hand turn of the vehicle.

If the steering shaft 92 is turned in a counterclockwise direction (as seen by the driver) for a left-hand turn of the vehicle, the rotational motion is translated into axial upward motion of the shaft (to the right in the drawings) by the thread 94 because the piston shaft 48 initially acts as a fixed nut. The linear motion of the shaft 92, and the inner sleeve members 98 and 100 attached thereto, deflects the inner periphery of the valve member 62 upwardly (to the right in the drawings) until its upper side engages and seats on the circular valve seat 76 and its opposite, lower side engages the valve seat 126 on the inner sleeve member 100, as shown in FIG. 3. The right turn port 34 is now completely shut off from the pressure port 30 but it is still connected to the return port 36, since the passage between the valve member and the valve seat 124 remains open, whereas the left turn outlet port 32 is still connected to the pressure point 30 via the space between the valve member 62 and the valve seat 78, while it is completely disconnected from the return port 36 by the valve member 62 seating against the valve seat 126. The resulting pressure buildup on the upper side of the piston 46 via the line 56 and the left turn inlet port 54 shifts the piston 46 downwardly (to the left in the drawings), actuating the steering mechanism through the shaft 52 to steer the vehicle to the left, at the same time exerting a downward force on the steering shaft and its attached valve. When the piston 46 reaches a position corresponding to the angular position of the steering shaft 92, the valve is returned to its neutral condition, shown in FIG. 2. The valve member 62 is preferably made of relatively rigid, spring-like material, and provides a centering force, which provides some degree of "feel" at the steering wheel eliminating the need for additional springs to perform this function. Of course, the steering shaft 92 may not always be turned a sufficient degree to move the valve member to its extreme shutoff position as shown in FIG. 3, but any intermediate deflection of the valve member 62 results in a partial restriction of the passages between the valve member and the respective seats so that the pressure buildup is proportional to the degree of valve shutoff. As is apparent in FIG. 3, in the shutoff position, the valve member 62 engages only the inner edge of the outer sleeve member and the outer edge of the inner sleeve member, the relatively small annular contact area between the valve member and the valve seat providing a relatively large seating pressure to ensure minimum valve leakage in the shutoff position.

For right-hand turning of the vehicle, the above sequence is reversed and the valve member 62 is deflected downwardly (to the left in FIGS. 2 and 3), the extreme right turn or shutoff position being obtained when the valve member 62 seats against the outer valve seat 78 on the outer sleeve member 66 and the inner valve seat 124 of the inner sleeve member 98 seats against the valve member 62.

Another feature of the valve is the inherent hydraulic imbalance which assists in the actuation of the valve to lessen the effort required to steer the vehicle. Initially in neutral condition, there is no hydraulic imbalance. However, as the valve member 62 starts to deflect, decreasing the pressure in one of the outlets, the full inlet pressure is exerted on the valve member on one side of the valve between the outer valve periphery and the inner valve seat, whereas on the other side of the valve member, the full inlet pressure is only exerted on the valve member between the outer valve periphery and the outer valve seat, and pressure differential on the area between the inner and the outer valve seats creating an axial force which assists in the further deflection of the valve. Of course, the hydraulic imbalance force is necessarily less than the spring force exerted by the deflected valve member, although it does serve to reduce the operator effort required to steer the vehicle.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A valve comprising: a valve body having a cylindrical bore and an inlet port, a sump port, and first and second outlet ports; a disk-like valve member coaxially secured at its periphery in said valve bore between the outlet ports, the inlet port communicating with the bore on both sides of the valve member; first and second outer sleeve members coaxially and tightly mounted in said bore on opposite sides of the valve member, and respectively including first and second circular outer valve seats at their radial ends proximate to the valve member, the interiors of the first and second outer sleeve members respectively communicating with the first and second outlet ports; first and second inner sleeve members respectively coaxially mounted in and radially spaced from the first and second outer sleeve members' interiors on opposite sides of the valve member and respectively including first and second circular inner valve seats at their radial ends proximate to the valve member, the interiors of said inner sleeve members communicating with said sump port; and actuating means operably connected to the valve member and the inner sleeve members for axially shifting said inner sleeve members in unison and deflecting said valve member between a first position wherein it seats against the second outer valve seat and the first inner valve seat to connect the inlet port to the first outlet port only and second outlet port to the sump port only, and a second position wherein it seats against the first outer valve seat and the second inner valve seat to connect the first outlet port to the sump port only and the inlet port to the second outlet port only.

2. The invention defined in claim 1 and including spring means for biasing the valve member toward a neutral undeflected position between said first and second positions wherein the valve member is disengaged from said valve seats and the inlet, sump, and outlet ports are interconnected.

3. The invention defined in claim 2 wherein the valve member is of relatively stiff spring-like material and comprises said spring means.

4. The invention defined in claim 3 wherein the valve member has an axial bore and the actuating means includes a shaft coaxially extending through the valve member bore and the inner sleeve members and connected to said inner sleeve members.

5. The invention defined in claim 4 wherein the inner sleeve members respectively include clamping portions, radially offset from and extending axially beyond said valve seats and engaging opposite sides of said valve member.

6. A valve comprising: a valve body having a cylindrical bore and an inlet and first and second outlet ports; a disk-like valve member coaxially mounted in said bore and secured at its outer periphery to said body; first and second annular outer valve seats associated with said body and coaxially spaced from the opposite sides of said valve member, the first and second outlet ports respectively communicating with said bore on opposite sides of the valve member interiorly from the valve seats and the inlet port communicating with both sides of the valve member exteriorly of said valve seats; and actuating means operably connected to the central portion of the valve member to axially shift the central portion of the valve member relative to the valve body between a first position wherein it seats against said second outer valve seat to disconnect the second outlet from the inlet and a second position wherein it seats against the first outer valve seat to disconnect the first outlet from the inlet.

7. The invention defined in claim 6 and including a sump port in said body and first and second annular inner valve seats respectively coaxial with and interiorly from the first and second outer valve seats, respectively spaced from the opposite sides of the valve member, said sump port being connected to the valve bore interiorly of both inner valve seats only, the valve member engaging the first inner valve seat in the first valve member position to disconnect the first outlet port from the sump port and the valve member engaging the second inner valve seat in the second valve member position to disconnect the second outlet port from the sump port.

8. The invention defined in claim 7 and including first and second inner sleeve members coaxially spaced interiorly from the outer valve seats on opposite sides of the valve member, the first and second inner valve seats being formed by said sleeve member and also including an axial opening in said valve member, the actuating means including a shaft coaxially extending through the sleeve members and the valve member opening, the sleeve members and the inner periphery of the valve member being operably connected to said shaft for axial movement therewith between said first and second positions.

References Cited

UNITED STATES PATENTS 2,988,059 6/1961 Wysong _____ 91—380 XR
3,022,772 2/1962 Zeigler et al. _____ 91—380 XR
3,242,824 3/1966 Jablonsky et al. _____ 91—380
3,292,499 12/1966 Duffy _____ 91—368

FOREIGN PATENTS 1,100,189 3/1954 France.

M. CARY NELSON, Primary Examiner.

R. J. MILLER, Assistant Examiner.